United States Patent [19]
Yamashita

[11] 3,941,605
[45] Mar. 2, 1976

[54] REVERSIBLE LIGHT-SENSITIVE GLASS

[75] Inventor: Toshiharu Yamashita, Hachioji, Japan

[73] Assignees: Hoya Glass Works, Ltd.; Hoya Lens Co., Ltd., both of Tokyo, Japan

[22] Filed: July 31, 1974

[21] Appl. No.: 493,435

[30] Foreign Application Priority Data
Mar. 9, 1974  Japan.............................. 49-27444

[52] U.S. Cl. ............ 106/47 Q; 106/54; 106/DIG. 6
[51] Int. Cl.² ........................................... C03C 3/00
[58] Field of Search...... 106/47 R, 47 Q, 54, DIG. 6

[56] References Cited
UNITED STATES PATENTS

| | | | |
|---|---|---|---|
| 2,805,166 | 9/1957 | Lojfler | 106/54 |
| 3,208,860 | 9/1965 | Armstrad | 106/54 |
| 3,269,847 | 8/1966 | Chen | 106/54 |
| 3,328,182 | 6/1967 | Araujo | 106/54 |
| 3,419,370 | 12/1968 | Cramer | 106/54 |
| 3,594,198 | 7/1971 | Sperry | 106/54 |
| 3,706,688 | 12/1972 | Matsuma | 106/47 Q |
| 3,795,523 | 3/1974 | Moreya | 106/54 |

Primary Examiner—Patrick P. Garvin
Assistant Examiner—John F. Niebling
Attorney, Agent, or Firm—Sughrue, Rothwell, Mion, Zinn and Macpeak

[57] ABSTRACT

A reversible light-sensitive glass, e.g., for eyeglasses, comprising 100 parts of a base glass composition consisting, in weight percent, of 48 to 62% $SiO_2$, 15 to 22% $B_2O_3$, 0 to 11% $Al_2O_3$, 0 to 10% $ZrO_2$, $6 < Al_2O_3 + ZrO_2 < 13\%$, 6 to 16% $R_2O$ where R represents Li, Na or K, 0.5 to 7% BaO, $BaO/R_2O$ 0.035 to 0.65, 0 to 2% $TiO_2$, 0 to 2.5% $Nd_2O_3$, 0 to 2.5% $Ho_2O_3$, 0 to 2.5% $Er_2O_3$, $0.2 < Nd_2O_3 + Ho_2O_3 + Er_2O_3 < 2.5\%$ and 0.002 to 0.03% CuO, and as light-sensitive components 0.15 to 1.0 part of Ag and more than the Ag chemical equivalent of halogens selected from the group consisting of Cl, Br and I.

2 Claims, 2 Drawing Figures

REVERSIBLE LIGHT-SENSITIVE GLASS

BACKGROUND OF THE INVENTION

1. Field of the Invention

This invention relates to a reversible light-sensitive glass, e.g., for eyeglasses, which contains the colored rare earth elements of $Nd_2O_3$, $Ho_2O_3$ and $Er_2O_3$ having an anti-dazzling effect and which has a refractive index of 1.50 to 1.55, and in which the percent transmission of the glass changes abruptly and reversibly due to irradiation with ultraviolet light and visible light of short wavelengths.

2. Description of the Prior Art

Generally, eyeglasses are roughly classified into those glasses intended to correct faulty vision and sunglasses for protecting the eyes from the strong glare of the sun. The present invention provides a reversible light-sensitive glass for eyeglasses having both of these properties and in which the percent transmission changes with the intensity of the light.

The glasses used for eyeglasses having the above two properties, include those glasses obtained by incorporating or coating a small amount of a coloring component into or on a conventional colorless glass for eyeglasses and reversible light-sensitive glasses for eyeglasses. The former scarcely have any anti-dazzling effect under the strong glare of the sun. The latter also have poor anti-dazzling effects when looking at bright outdoor views from inside a dark room, since the glasses do not become colored unless they are directly exposed to light.

SUMMARY OF THE INVENTION

A reversible light-sensitive glass having a fast rate of decoloration as disclosed in Japanese Patent Application No. 551/1974 has already been provided, and in the present invention, the above defect has been remedied by further introducing $Nd_2O_3$, $Ho_2O_3$ and $Er_2O_3$.

This invention provides a reversible light-sensitive glass comprising 100 parts of a base glass composition consisting, in weight percent, of 48 to 62% $SiO_2$, 15 to 22% $B_2O_3$, 0 to 11% $Al_2O_3$, 0 to 10% $ZrO_2$, 6<$Al_2O_3$ + $ZrO_2$<13%, 6 to 16% $R_2O$ where R represents Li, Na or K, 0.5 to 7% BaO, a BaO/$R_2O$ weight ratio of 0.035 to 0.65, 0 to 2% $TiO_2$, 0 to 2.5% $Nd_2O_3$, 0 to 2.5% $Ho_2O_3$, 0 to 2.5% $Er_2O_3$, 0.2<$Nd_2O_3$ + $Ho_2O_3$ + $Er_2O_3$<2.5% and 0.002 to 0.03% CuO, and as light-sensitive components 0.15 to 1.0 part of Ag and more than the Ag chemical equivalent of halogens selected from the group consisting of Cl, Br and I.

DETAILED DESCRIPTION OF THE INVENTION

Figure 1:
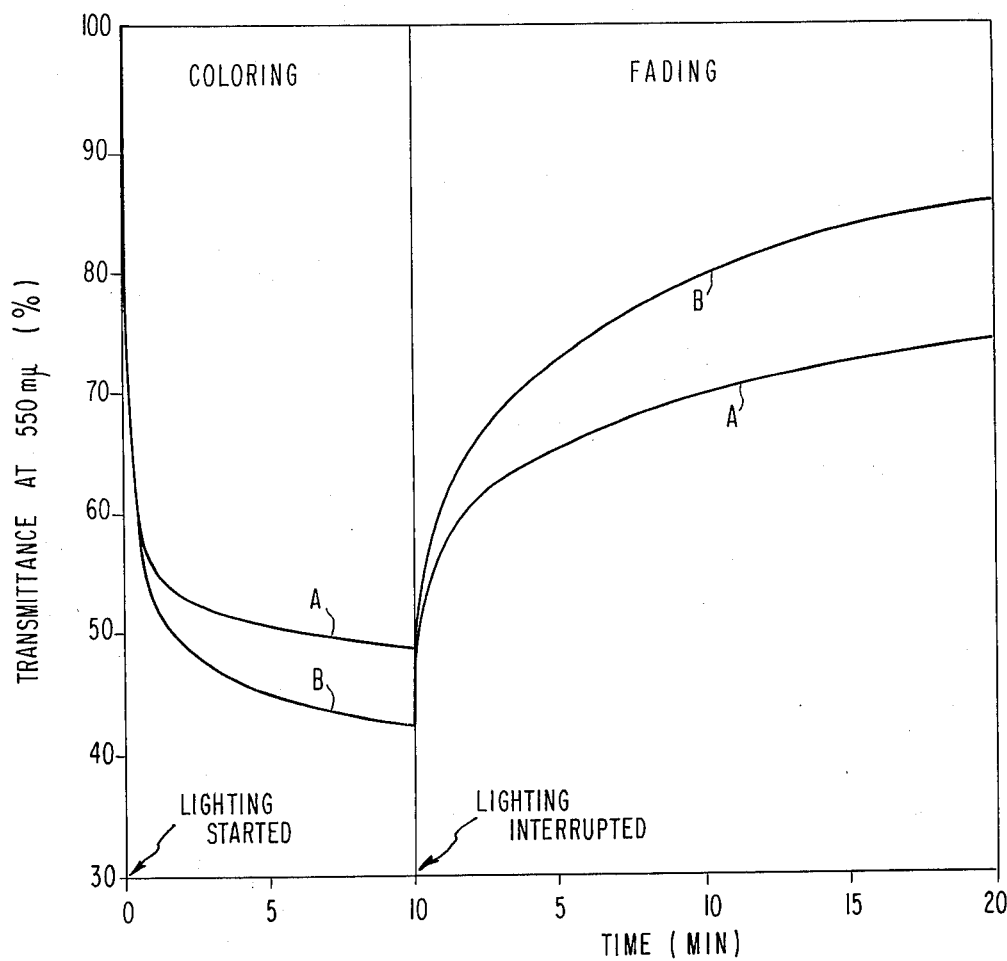
FIG. 1 is a diagram showing the coloration-decoloration curves of a commercially available reversible light-sensitive glass for eyeglasses and an embodiment of the present invention in which curve A is the coloration-decoloration curve of a commercially available light-sensitive eyeglass and curve B is the coloration-decoloration curve of the glass in the example of the present invention.

Eyeglasses containing a small amount of $Nd_2O_3$ have already been commercially available, but their anti-dazzling effects under strong light are not sufficient, and eyeglasses having an anti-dazzling effect which contain $Ho_2O_3$ which becomes brown in color or $Er_2O_3$ which becomes light pink in color are not known. There has been no prior example in which these components are incorporated in reversible light-sensitive glasses for eyeglasses. This is because it has been thought that, since these components have absorptions in the ultraviolet region which gives rise to coloration, the coloring properties of the reversible lightsensitive glass would be impaired.

The reversible light-sensitive glass for eyeglasses in accordance with this invention are characterized in that even when $Nd_2O_3$, $Ho_2O_3$ and $Er_2O_3$ are incorporated, no reduction at all in the coloring properties is brought about, and that they have a fast rate of fading and have a grey color after irradiation of light. Accordingly, the elegant color tone ascribable to these rare earth ions is maintained, and the glass is suitable for use in eyeglasses. Furthermore, the introduction of these elements has an effect of increasing the chemical durability of the glass which is essential to eyeglass uses. The above discovery led to the present invention.

One example of the increase of chemical durability due to the introduction of $Nd_2O_3$ is shown below.

|  | Without $Nd_2O_3$ | With $Nd_2O_3$ |
|---|---|---|
| $SiO_2$ | 58.6 | 58.6 |
| $B_2O_3$ | 18.6 | 18.6 |
| $Al_2O_3$ | 1.5 | 1.5 |
| $ZrO_2$ | 6.4 | 6.4 |
| $K_2O$ | 8.1 | 8.1 |
| $Li_2O$ | 1.8 | 1.8 |
| BaO | 3.4 | 1.9 |
| $TiO_2$ | 1.5 | 1.5 |
| $Nd_2O_3$ | — | 1.5 |
| Ag | 0.3 | 0.3 |
| Cl | 1.1 | 1.1 |
| CuO | 0.006 | 0.006 |
| Acid Resistance (shown by weight loss) (%) | 0.13 | 0.10 |

The acid resistance shown by weight loss was measured by the powder method.

It has also been found that when $Nd_2O_3$ is incorporated, it is preferred to adjust the Cl/Br ratio to greater than 1 because if Br is contained in a larger proportion than Cl as in commercially available reversible light-sensitive glasses for eyeglasses, the light transmission in the visible short wavelength region becomes poor. In addition, the clear color tone ascribable inherently to $Nd^{3+}$ ions cannot be obtained and the color becomes dull.

Also, it has been found that $PrO_2$ makes the glass green and does not give anti-dazzling effect, but that $PrO_2$ can tint the glass to various extents due to the presence of $Nd_2O_3$, $Ho_2O_3$ and $Er_2O_3$. $Sm_2O_3$ and/or $PrO_2$ is also effective as a coloring agent and then $Nd_2O_3$ can be replaced by $Sm_2O_3$ and/or $PrO_2$ for controlling the hue.

Based on the above-mentioned discovery, the present invention has made it possible to render the anti-dazzling effect feasible over a wide range without deteriorating coloring and decoloring properties and chemical durability, and provides a reversible light-sensitive glass comprising 100 parts of a base glass composition consisting, in weight percent, of 48 to 62% $SiO_2$, 15 to 22% $B_2O_3$, 0 to 11% $Al_2O_3$, 0 to 10% $ZrO_2$, 6%<$Al_2O_3$ + $ZrO_2$<13%, 6 to 16% $R_2O$ (where R represents Li, Na or K), 0.5 to 7% BaO, BaO/$R_2O$ 0.035 to 0.65, 0 to 2 % $TiO_2$, 0 to 2.5% $Nd_2O_3$, 0 to 2.5% $Ho_2O_3$, 0 to 2.5% $Er_2O_3$, 0.2% <$Nd_2O_3$ + $Ho_2O_3$ + $Er_2O_3$ <2.5%, and 0.002 to 0.03% CuO, and as light-sensitive components 0.15 to 1.0 part of Ag and greater than the chemical Ag equivalent of halogens selected from the group consisting of Cl, Br and I.

If the proportion of $SiO_2$ is greater than 62%, a glass with a high density of coloration and a fast rate of decoloration cannot be obtained. Also, the melting of the glass becomes difficult. If the proportion is less than 48%, the chemical durability of the glass is poor, and the glass tends to be susceptible to phase separation during heat-treatment.

BaO even in a very small amount has the effect of markedly increasing the density of coloration, and when co-present with $R_2O$, especially $K_2O$, BaO has the effect of increasing the rate of decoloration.

In order to obtain a density and a rate of decoloration sufficient for practical light-shielding eyeglass lenses, it is necessary that the BaO/$R_2O$ ratio should be at least 0.035 when the proportion of BaO is greater than 7% and the BaO/$R_2O$ ratio is above 0.65, the density of coloration rather decreases, and the rate of decoloration also becomes slower. If the proportion of $R_2O$ is less than 6%, effect of the $R_2O$ in the co-presence of BaO is weak, and if the proportion is above 16%, the chemical durability of the glass is reduced and the rate of decoloration becomes slower.

If the proportion of $B_2O_3$ is less than 15%, effect of the $B_2O_3$ in the co-presence of BaO and $R_2O$ is weak. Better results are obtained with larger proportions of the $B_2O_3$, but if the proportion of this component is above 22%, the glass becomes unstable, and both its transparency and chemical durability are reduced.

If the proportion of $Al_2O_3$ is above 11%, a stable glass having a refractive index of at least 1.5 cannot be obtained unless the amount of $ZrO_2$ to be incorporated is reduced, and thus, the object of this invention cannot be achieved. Further, if the proportion of $ZrO_2$ exceeds 10%, not only does the glass become unstable, but also the rate of decoloration decreases. If the proportion of $Al_2O_3$ + $ZrO_2$ is less than 6%, a glass with good chemical durability cannot be obtained, and if the proportion of $Al_2O_3$ + $ZrO_2$ exceeds 13%, the glass becomes unstable, and also, the rate of decoloration is adversely affected.

If the proportion of $TiO_2$ is above 2%, the light absorption in the ultraviolet region is increased deteriorating the light-sensitivity of the glass.

When the content of $Nd_2O_3$, $Ho_2O_3$ and $Er_2O_3$ and $Er_2O_3$ is less than 0.2%, the glass has a poor anti-dazzling effect, and when these components are used individually or the content of these components exceeds 2.5%, the density of coloration caused by these components is too high, and a sunglass-like product results. Particularly in the case of $Er_2O_b$, light absorption occurs in the vicinity of light of wavelengths, in which the visual sensitivity of the human eye is the strongest, and the anti-dazzling effect of $Er_2O_3$ is greater than that of $Nd_2O_3$. When these rare earth elements are mixed, glasses of various colors can be obtained.

The light-sensitive components to be added to 100 parts of the base glass composition described above are 0.15 to 1.0 part of Ag and greater than the chemical Ag equivalent of halogens, e.g., up to about 2%. If the amount of Ag is less than 0.15 part, the amount of silver halide crystals precipitated in the glass is small, and sufficient density of coloration cannot be obtained. If the amount is above 1.0 part, a light milk-white turbidity occurs in the glass, and the glass cannot be used for eyeglass lenses. If the amount of the halogens is less than the chemical Ag equivalent, it is impossible to obtain sufficient density of coloration.

CuO in a very small amount has the effect of increasing the density of coloration, but this effect is observed with an amount of 0.002 to 0.03%.

The following Examples of the present invention are given below to explain the invention in greater detail. All components are expressed in % by weight.

|  | Example | | | | | | |
|---|---|---|---|---|---|---|---|
|  | 1 | 2 | 3 | 4 | 5 | 6 | 7 |
| $SiO_2$ | 56.4 | 59.9 | 61.4 | 56.4 | 59.3 | 59.3 | 59.4 |
| $B_2O_3$ | 18.9 | 18.5 | 19.5 | 18.3 | 18.8 | 16.8 | 21.0 |
| $Al_2O_3$ | 7.0 | 1.0 | 1.0 | 1.0 | 1.0 | 1.0 | 1.0 |
| $ZrO_2$ | — | 9.0 | 8.3 | 7.2 | 6.4 | 8.0 | 8.0 |
| $K_2O$ | 8.2 | 8.2 | 4.7 | 13.6 | 8.2 | 9.8 | 6.6 |
| $Na_2O$ | — | — | — | — | 1.9 | — | — |
| $Li_2O$ | 1.8 | 1.8 | 3.0 | — | 0.9 | 2.2 | 1.0 |
| BaO | 5.7 | 1.2 | 0.5 | 0.5 | 1.1 | 0.9 | 0.9 |
| $TiO_2$ | 1.0 | — | 1.1 | 1.0 | 1.4 | 1.5 | 1.2 |
| $Nd_2O_3$ | 1.0 | 0.4 | 0.5 | 2.0 | — | — | — |
| $Ho_2O_3$ | — | — | — | — | — | — | 0.3 |
| $Er_2O_3$ | — | — | — | — | 1.0 | 0.5 | 0.5 |
| Ag | 0.2 | 0.3 | 0.3 | 0.25 | 0.3 | 0.3 | 0.3 |
| Cl | 1.1 | 0.9 | 1.0 | 0.9 | 0.7 | 0.7 | 0.9 |
| Br | — | 0.2 | 0.1 | 0.2 | 0.2 | — | 0.2 |
| I | — | — | — | — | 0.2 | — | — |
| CuO | 0.008 | 0.010 | 0.004 | 0.010 | 0.008 | 0.006 | 0.006 |
| $n_d$ | 1.51881 | 1.52549 | 1.51502 | 1.51673 | 1.51527 | 1.52770 | 1.51474 |
| Da (%) | 0.12 | 0.10 | 0.12 | 0.13 | 0.16 | 0.08 | 0.20 |

|  |  |  |  | Example |  |  |  |
|---|---|---|---|---|---|---|---|
|  | 8 | 9 | 10 | 11 | 12 | 13 | 14 |
| $SiO_2$ | 54.6 | 59.4 | 58.1 | 58.1 | 58.1 | 59.4 | 59.4 |
| $B_2O_3$ | 18.9 | 18.9 | 19.1 | 19.1 | 19.1 | 18.9 | 18.9 |
| $Al_2O_3$ | 4.5 | — | 1.5 | 1.5 | 1.5 | — | — |
| $ZrO_2$ | 6.0 | 7.5 | 6.4 | 6.4 | 6.4 | 7.5 | 7.5 |
| $K_2O$ | 8.2 | 8.2 | 8.1 | 8.1 | 8.1 | 8.2 | 8.2 |

|  | Example | | | | | | |
|---|---|---|---|---|---|---|---|
|  | 1 | 2 | 3 | 4 | 5 | 6 | 7 |
| Na$_2$O | — | — | — | — | — | — | — |
| Li$_2$O | 1.8 | 1.8 | 1.8 | 1.8 | 1.8 | 1.8 | 1.8 |
| BaO | 4.5 | 1.7 | 1.9 | 1.9 | 1.9 | 1.7 | 1.7 |
| TiO$_2$ | 1.0 | 1.5 | 1.5 | 1.5 | 1.5 | 1.5 | 1.5 |
| Nd$_2$O$_3$ | — | — | 1.5 | — | — | 0.5 | 0.5 |
| Ho$_2$O$_3$ | 0.5 | 1.0 | — | 1.3 | — | (PrO$_2$) 0.5 | (SmO$_2$) 0.5 |
| Er$_2$O$_3$ | — | — | — | — | 1.5 | — | — |
| Ag | 0.3 | 0.3 | 0.3 | 0.3 | 0.3 | 0.3 | 0.3 |
| Cl | 0.6 | 0.7 | 1.1 | 1.1 | 1.1 | 0.7 | 0.7 |
| Br | 0.4 | 0.2 | — | — | — | 0.2 | 0.2 |
| I | — | — | — | — | — | — | — |
| CuO | 0.008 | 0.008 | 0.010 | 0.010 | 0.010 | 0.008 | 0.008 |
| n$_d$ | 1.52732 | 1.52062 | 1.52376 | 1.52201 | 1.52193 | 1.52286 | 1.52243 |
| Da (%) | 0.15 | 0.11 | 0.13 | 0.12 | 0.14 | 0.15 | 0.15 |

The glass of this invention can be obtained by mixing the desired raw materials for the glass, melting the glass batch in a platinum crucible or a ceramic crucible at a temperature between 1400° and 1500°C, and after agitation casting the molten batch into a mold, or directly feeding the molten glass into a mold as required and pressing it. By heat-treating the resulting glass at a temperature between its transition point and its softening point for several minutes to several hours, a reversible light-sensitive glass can be obtained which has fast rates of coloration and decoloration and has a color preferred for use in eyeglasses.

The drawings show one example of the present invention. A reversible light-sensitive glass has been successfully obtained which has fast rates of coloration and decoloration and also has the color preferred for use in eyeglasses both before and after light irradiation, and which exhibits its anti-dazzling effect over a wider range than conventional eyeglass-purpose glasses concurrently having anti-dazzling effects. Commercially available reversible light-sensitive glasses require more than 60 minutes until 90% of the decrease in percent transmission caused by the irradiation of ultraviolet rays is restored, and their speed of adaptation to brightness and darkness is too slow. Furthermore, with these conventional glasses, anti-dazzling effects cannot be expected when looking at bright outdoor views from inside a dark room. Furthermore, eyeglass-purpose eyeglasses containing Nd$_2$O$_3$ have poor anti-dazzling effects under strong light. In contrast, with the glass of this invention, the time required to restore 90% of the decrease in transparency is 5 to 20 minutes, and thus, the rates of coloration and decoloration are fast and the adaptation to light is excellent. Furthermore, the glass of this invention has an anti-dazzling effect even when looking at outdoor views from inside a dark room.

In addition, the chemical durability of the reversible light-sensitive glass shown in Japanese Patent Application No. 551/1974 can be further increased. For example, materials consisting of 69.7 g of SiO$_2$, 40.7 g of H$_3$BO$_3$, 2.8 g of Al(OH)$_3$, 7.7 g of ZrO$_2$, 17.5 g of KNO$_3$, 5.4 g of Li$_2$CO$_3$, 3.8 g of Ba(NO$_3$)$_2$, 1.8 g of TiO$_2$, 1.8 g of Nd$_2$O$_3$, 0.36 g of AgCl, 2.5 g of KCl and 0.012 g of CuO were well mixed, and the mixture was melted in a 50 cc platinum crucible for about 2.5 hours using an electric furnace at 1420°C with stirring during melting and then poured onto an iron plate, followed by annealing.

The glass so obtained was not light-sensitive. However, when the glass was heat-treated at 580°C for 2.5 hours, the glass exhibited marked light sensitivity upon irradiation with ultraviolet rays, and the glass obtained has the reversible light sensitivity and color tone shown in the drawings. This glass has a refractive index (n$_d$) of 1.52318 which is within 1.52300 ± 0.001 (refractive index standards for eyeglass-purpose glasses), and a weight loss (acid resistance) of 0.13% which means that there is no risk of chemical attack during use. Furthermore, the turbidity of glass ascribable to the scattering of light is reduced as compared with the commercially available reversible light-sensitive lenses for eyeglasses, and the color tone before and after the irradiation of light is preferred for use in eyeglass-purpose glasses. In addition, the anti-dazzling effect extends over a wide range.

Figure 2:
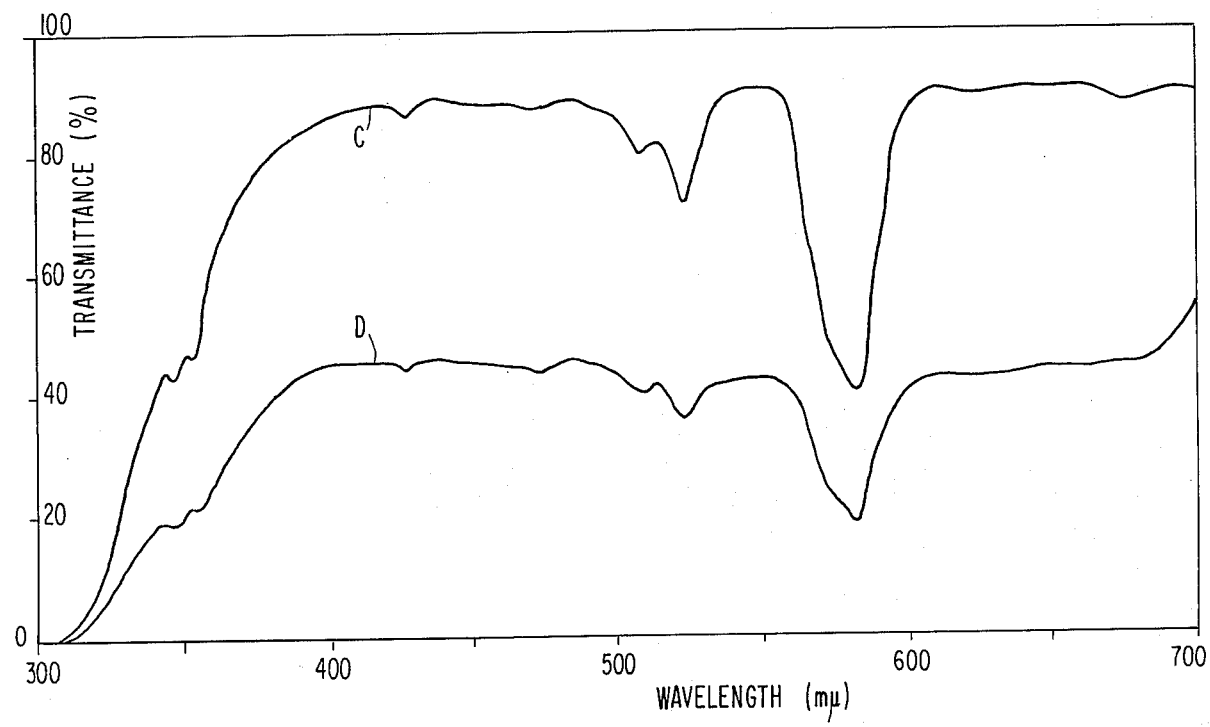
FIG. 2 is a diagram showing the spectral percent transmission curves of the glass in an example of this invention before and after the irradiation of ultraviolet rays in which curve C is the spectral percent transmission curve of the glass in the example of the present invention before irradiation with ultraviolet rays and curve D is the spectral percent transmission curve of the same glass after the irradiation with ultraviolet rays.

In FIG. 1, A shows the coloration-decoloration curve of a commercially available reversible light-sensitive glass for eyeglasses, and B shows that of the glass in accordance with the example of this invention given above. FIG. 2 shows spectral percent transmission curves before and after the irradiation of ultraviolet rays in accordance with the example of this invention, in which C is a pre-irradiation curve, and D is a post-irradiation curve. A 500 W Xenon lamp was used as a light source for coloration, and light was irradiated onto a glass plate polished to a thickness of 2 mm at a distance of 50 cm. The decoloration occurred spontaneously without irradiation of light.

While the invention has been described in detail and with reference to specific embodiments thereof, it will be apparent to one skilled in the art that various changes and modifications can be made therein without departing from the spirit and scope thereof.

What is claimed is:

1. A reversible light-sensitive glass comprising 100 parts of a base glass composition consisting, in weight percent, of 48 to 62% SiO$_2$, 15 to 22% B$_2$O$_3$, 0 to 11% Al$_2$O$_3$, 0 to 10% ZrO$_2$, 6<Al$_2$O$_3$+ZrO$_2$<13%, 6 to 16% R$_2$O where R represents Li, Na or K, 0.5 to 7% BaO, a BaO/R$_2$O ratio of 0.035 to 0.65, 0 to 2% TiO$_2$, 0 to 2.5% Nd$_2$O$_3$, 0 to 2.5% Ho$_2$O$_3$, 0 to 2.5% Er$_2$O$_3$, 0.2<Nd$_2$O$_3$ + Ho$_2$O$_3$ + Er$_2$O$_3$<2.5% and 0.002 to 0.03% CuO, and as light-sensitive components 0.15 to 1.0 part of Ag and more than the Ag chemical equivalent of halogens selected from the group consisting of Cl, Br and I.

2. A reversible light-sensitive glass according to claim 1 in which some or all of the Nd$_2$O$_3$ is replaced by Sm$_2$O$_3$, PrO$_2$, or mixtures thereof.

* * * * *